Nov. 24, 1959  R. D. FERRIS  2,914,103
CUTTER ASSEMBLY FOR MEAT GRINDERS
Filed Nov. 4, 1957

INVENTOR:
RICHARD D. FERRIS
BY
ATT'Y

United States Patent Office 2,914,103
Patented Nov. 24, 1959

2,914,103

CUTTER ASSEMBLY FOR MEAT GRINDERS

Richard D. Ferris, Dallas, Tex., assignor to The Allbright-Nell Co., Chicago, Ill., a corporation of Illinois Application November 4, 1957, Serial No. 694,281

4 Claims. (Cl. 146—182)

The present invention relates to cutter assemblies for meat grinders and more particularly to that type of rotary cutter assembly which is comprised of a backing spider to which there is detachably secured a knife proper having a series of radially disposed knife blades provided with cutting edges which are adapted to fit against the inner face of a cooperating flat circular perforated shear plate at the discharge end of the meat grinder, the assembly being adapted to be driven in unison with a feed screw rotating within the meat grinder casing so that the knife blade edges will sweep around the inner face of the plate and shear such portions of the meat or other substance undergoing grinding as are forced into the plate perforations from the main body of the substance within the casing.

Heretofore, cutter assemblies of the type briefly outlined above are invariably constructed and so mounted within the meat grinder casing that the inclination of the individual knife blades and the inclination of the helical threads provided on the feed screw in advance of the knife blades oppose each other, which is to say that whereas the helical threads on the feed screw are inclined in a direction which will advance the product undergoing grinding axially along the cylindrical bore in which the feed screw is mounted toward the perforated shear plate, the inclination or pitch direction of the individual shearing knife blades is in the opposite direction whereby these knife blades operate in the manner of scoops tending to force the main body of the product rearwardly against the direction of feed. Such opposition of the knife blades and feed screw, insofar as directional impelling forces on the body of the product passing through the meat grinder is concerned, is not conducive toward effective treatment of the product, particularly if it is desired that the product shall issue from the grinder with a diced effect. Inasmuch as the feed screw tends to advance the product uniformly toward the perforated shear plate and the knife blades tend to shear the product from the feed plate and return the same to the feed screw, a region of the high pressure is built up at the discharge end of the grinder between the knife blades and the feed screw. Immediately in advance of the leading or shearing edges of the knife blades, a region of highest pressure exists since the feed screw and knife blades tend to force the product in opposite directions and consolidate the same in this region. Immediately behind the leading or shearing edges of the knife blades there is a region of lesser pressure which operates in the manner of a partial vacuum to draw the product which has previously been forced through the perforated shear plate in advance of these leading edges backwardly into the grinder housing through the perforated plate so that a portion of the product which has previously been sheared and passed toward the discharge is returned and again sheared by the next succeeding shear blades, thus contributing toward non-uniform shearing of the product and undesired comminution of product particles. Under certain circumstances, the existence of such a relatively low pressure region of the product immediately in advance of the shear plate and on the trailing sides of the rotating knife blades creates an area of shearing ineffectiveness where there is an absence of the product in advance of the oncoming shearing edges of the blades.

The present invention is designed to overcome the above-noted limitations that are attendant upon the use of conventional cutter assemblies and, toward this end, there is contemplated the provision of a cutter assembly wherein the knife proper is formed with a series of radially extending knife blades, having blade bodies the inclination or pitch direction of which are in conformity with the inclination or pitch direction of the feed screw or impeller threads so that when the product leaves the feed screw at the forward end thereof it is picked up, so to speak, by the knife blades and further advanced toward the perforated shear plate so that the pressure existing in the immediate vicinity of the shear plate on the inside of the grinder housing is substantially uniform and the product is equally distributed in the interstices between adjacent knife blades whereby the product will be uniformly encountered by each leading or shearing edge as the knife blade and impeller assembly rotate relative to the perforated shear plate.

The provision of a cutter assembly of the character set forth above being among the principal objects of the invention, a further object is to provide a cutter assembly having a series of radially extending knife blades wherein each knife blade is provided with a shearing edge region adapted to sweep circumferentially around the surface of the perforated shear plate and in which neither the circumferential extent by which the shearing edge proper leads the overall trailing edge of the knife blade nor the overall longitudinal width of the shearing edge region is of sufficient extent as to create any back pressure on the product in the vicinity of the perforated shear plate.

It is another object of the invention to provide a cutter assembly having a knife blade element associated therewith in which the shearing region of each knife blade arm is preceded by a relatively wide area cam surface which advances in a circumferential direction through the product at a region between the foremost end of the feed screw and the shearing edge proper and which surface is inclined in such a direction as to advance the product against the shear plate and into the path of the shearing edge so as to nullify any tendency, however slight, of the shearing region of the blade to return the product to the feed screw.

A still further object of the invention, in a cutter assembly of this character, is to provide a knife element having radial knife blades formed thereon each of which is provided with a shearing region and a camming region as briefly outlined above and wherein the camming region leads the shearing region in a circumferential direction and in which the leading edge of such camming region is provided with a second cutting edge in advance of the camming region, this edge being adapted to sweep through the product circumferentially at the point where the product leaves the feed screw and sever a portion of the product from the forward end of the feed screw so that the same may be more effectively carried across the face of the camming portion of the knife blade and pressed into contact with the perforated shear plate for cooperation with the trailing and oncoming shearing edge of the knife blade.

Yet another object of the invention is to provide a composite cutter assembly including a backing spider and knife proper having novel means for detachably securing the knife proper to the backing spider by a "snap in" action whereby the knife may be applied to and removed from the backing spider by a simple manual operation which dos not require the use of tools and which may be effectively performed without any particular skill on the part of the operator and without necessitating contact of the fingers with any sharpened portion of the knife. In carrying out this last mentioned object, the invention contemplates the provision of a one-piece backing spider having a central hub from which there diverges radially a series of spider arms. The knife, in a general way is patterned, insofar as its shape is concerned, along the same lines as the spider, it, too, having a central hub and a series of knife blades. The hub and blades of the knife are adapted to overlie the hub and arms respectively of the spider when the two parts are assembled, with the knife lying substantially within the radial confines of the spider. Each spider arm is formed with an inclined seat throughout its radial extent and against which a generally flat portion of a respective knife blade is adapted to lie in coextensive face-to-face relationship. A pin has one end thereof projecting forwardly from the surface of each seat and is designed for registry with a hole provided in the knife blade associated with such seat. In the trailing regions of each spider arm there is provided a radial shoulder which is slightly recessed and which is designed to receive therein the extreme trailing regions of the knife blade. Each spider arm is machined so that the distance between the retaining pin and the retaining shoulder is slightly less than the distance between the cooperating hole in the knife blade and the extreme trailing edge region of the knife blades whereby, when the pin is projected into the hole and the trailing edge of the blade positioned against the shoulder, a slight amount of pressure on the knife blade tending to force the same against its seat will cause the trailing region of the blade to snap into position against the shoulder and retain the blade in position on its respective arm.

Other objects and advantages of the invention, not at this time enumerated, will become more readily apparent as the following description ensues.

In the accompanying single sheet of drawing forming a part of this specification, a preferred embodiment of the invention has been shown.

Figure 1:
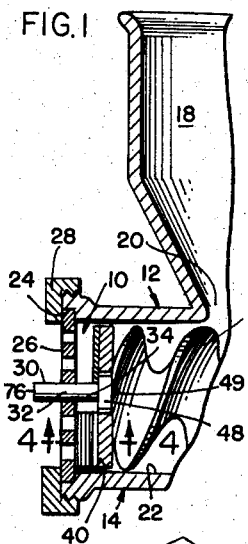
Fig. 1 is a fragmentary, vertical, longitudinal, sectional view taken substantially centrally through the discharge end of a meat grinder, showing a cutter assembly constructed in accordance with the principles of the present invention operatively installed therein.

Referring now to the drawings in detail and in particular to Fig. 1, the cutter assembly of the present invention is designated in its entirety at 10 and it is shown as being operatively mounted in a conventional meat grinder 12, only a fragmentary portion of the grinder in the vicinity of the discharge end thereof being shown herein. The grinder 12 includes a horizontally extending tubular casing portion 14 within which there operates the usual feed screw 16. The casing 12 is provided with a feed hopper 18 communicating with a feed opening 20 and the forward end of the feed bore 22 is recessed as at 24 to receive thereacross a perforated shear plate 26 having openings 27 therein, the plate being held in position over the opening of the grinder by a threaded clamping ring 28. The feed screw 16 extends longitudinally through the casing bore 22 and is adapted, during operation of the grinder, to feed the meat or other substance undergoing grinding from the hopper 18 to and through the perforated plate 26. It corresponds in diameter to the internal diameter of the casing bore 22 and is supported at its discharge end by means of a shaft 30 which projects through a bearing hole 32 formed in the central region of the plate 26. The shaft 30 is provided with a polygonal driving hub 34 adapted to receive thereover the cutter assembly 10 in driving relationship so that the assembly will be rotated in unison with the feed screw 16 in a manner and for a purpose that will be set forth presently.

Figure 2:
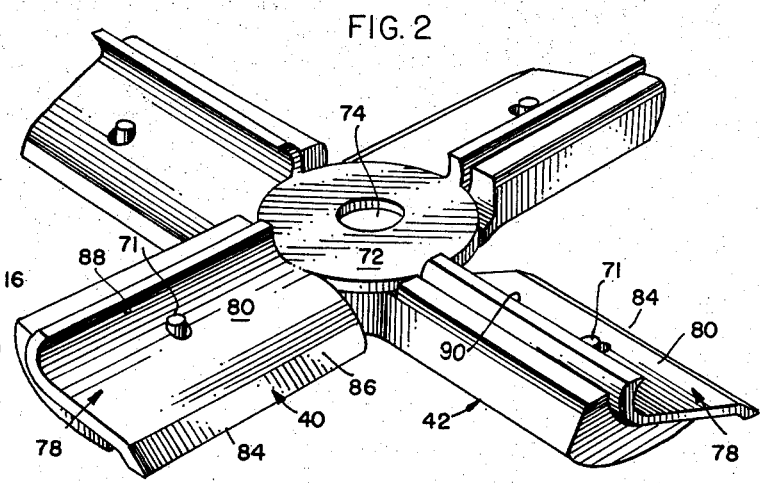
Fig. 2 is an enlarged perspective view of the assembled cutter.
Figure 3:
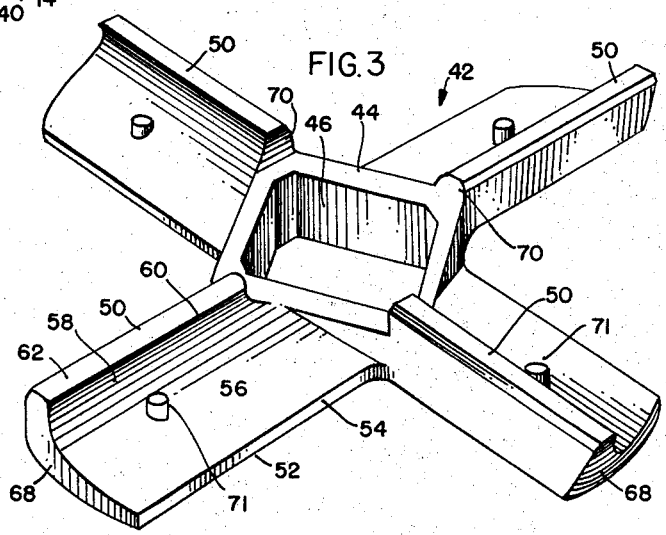
Fig. 3 is an enlarged perspective view of a backing spider employed in connection with the present invention.
Figure 4:
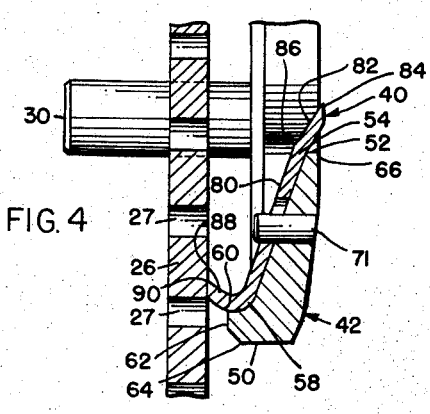
Fig. 4 is an enlarged sectional view taken substantially along the line 4—4 of Fig. 1.

Referring now to Figs. 2, 3 and 4, the cutter assembly 10 is comprised of two main parts, namely a knife 40 and a backing spider 42 therefor, the latter being shown in detail in Fig. 3. Both the spider 40 and knife 42 are of one-piece integral construction, the former preferably being a casting and the latter being a stamping. The spider 42 includes a central hub 44 having formed therein a polygonal mounting hole 46, the hole preferably being of square design. The hole 46 corresponds in shape to, and is adapted to be received over, the enlargement 34 of the drive shaft 30 with the rear face of the hub 44 fitting against a flat shoulder 48 provided on the forward end of the feed screw 16.

Extending radially outwardly from the hub 44, but offset slightly on secant axes which are spaced from true radial axes, are a series of four backing arms 50. The various arms of adjacent pairs are arranged at right angles to each other and, since all of the arms are identical in size and configuration, it is thought that a description of one of them will suffice for the others. As best seen in Figs. 2 and 4, each arm is roughly of distorted tear-drop configuration in transverse cross section and is provided with a narrow flat or blunt forward leading edge 52 having an upper edge 54 which constitutes the forward extremity of a hollow curved recessed surface 56 having a radius of curvature which progressively decreases from the leading edge 52 rearwardly toward the trailing side of the arm 50. In the vicinity of the edge 54, the surface 56 is almost planar and the decrease in radius is gradual and slight until the rearmost region of the curved surface 56 is reached. At a region 58, as seen in Fig. 4, the radius of curvature of the surface 56 decreases abruptly to provide a hook-like portion which, in effect, provides a shallow groove or channel which faces forwardly in the direction of rotation of the cutter assembly, the channel terminating in a relatively sharp ridge or edge 60. The edge 60 constitutes the leading edge of a flat planar surface 62 of relatively narrow transverse extent and this surface 62 intersects with an inclined bevel surface 64 on the rear upper side of the arm 50. The underneath surface of the arm 50 is progressively curved on a varying radius of curvature, the curve extending from the edge of the bevel surface 64 forwardly and downwardly toward the lower edge 66 of the flat front blunt leading edge 52. In the rear or trailing regions of the curve, the radius of curvature is relatively short while in the forward or leading regions of this curve the radius of curvature is extremely long so that the curve approaches planar proportions in the vicinity of the edge 66. The end 68 of the arm 50 is flat as seen in Figs. 2 and 3.

The casting which comprises the backing plate or spider 42 is illustrated in Figs. 2 and 3 as being disposed in a horizontal plane. With this reference orientation of the spider, the horizontal upper surfaces 62 of the four spider arms 50 lie in a common horizontal plane somewhat above the uppermost horizontal plane of the hub 44 so that these four surfaces 62, together with the adjacent surfaces 64 and 58 which merge thereinto, constitute in effect a series of four substantially radially extending upstanding ribs 70 on the upper side of the spider structure. These ribs directly oppose the perforated shear plate 26 in the assembled structure as seen in Figs. 1 and 4. Each blade 50 has pressed therein a pin 71, one end of which projects upwardly behind the upper face of the surface 56 a slight distance and which pin is adapted to perform certain functions of a locking nature in connection with the knife 40, as will be described subsequently.

Figure 5:
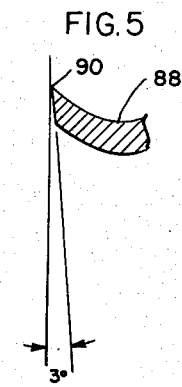
Fig. 5 is an enlarged detailed sectional view showing a portion of the structure of Fig. 4.

Referring now to Figs. 1, 4 and 5, the knife 40 is provided with an outline which is somewhat similar to the outline of the backing spider 42 and it may be in the form of a stamping having a generally circular hub portion 72 provided with a circular central opening 74 therein, the opening 74 and the opening 46 being adapted to fall into alignment or register when the knife is positioned on the backing spider. In the grinder assembly, the opening 74 is adapted to receive therethrough the forward projecting end 76 of the shaft 30. Extending on respective axes which are offset from the center of the hub 72 are a series of four knife arms or blades 78, each of which is formed with a medial inclined body portion 80 having a curvature corresponding generally to the curvature of the seat portions 56 of the various spider arms 50. The leading edge region of the body portion 80 of each knife blade 78 is inclined downwardly as at 82 (Fig. 4) and the extreme leading edge of this inclined portion is sharpened by a machining or other operation to produce a generally radially extending leading cutting edge 84 for the knife blade. In the assembled meat grinder, the four leading edges 84 of the knife 40 are out of contact with the shear plate 26 and are spaced rearwardly therefrom by a distance equal to the overall thickness of the knife as seen in cross section in Fig. 4 and in end elevation in Fig. 2. The overall axial extent of the inclined portion 82 is somewhat greater than the overall axial extent of the flat leading edge 52 of the spider arm 50 so that upon rotation of the cutter assembly the inclined portion 82 of the knife blade leads the edge 52 with the latter following in the rotary path of travel of the former through the product. The rear edge 86 of the inclined portion 82 merges with the medial region or body proper 80 of the knife blade 78 and this body portion of the blade generally follows the curvature of the seat portion 56 of the backing spider arm 50. The radius of curvature of the portion 80 decreases sharply in the trailing regions thereof so that the trailing region of the knife blade terminates in a short reentrant portion 88 of relatively small overall radial extent and the free or outer edge of which extends forwardly in the direction of rotation of the cutter assembly so as to provide a radially extending cutting edge 90 (see also Fig. 5). The cutting edge 90 leads the remainder of the reentrant portion 88 and the free edge of the reentrant portion is machined on a 3° bias relative to the transverse plane of the cutter assembly. The cutting edge 90 is designed for contact with the inside face of the perforated shear plate 26 and the reentrant portion 88 is relatively steep so that the reentrant portion will have little tendency to scoop the product away from the inner face of the shear plate and return the same rearwardly along the shaft 30 in an axial direction opposed to the normal path of advancement of the product through the bore 22.

The extent of lead of the shearing edge 90 beyond the extreme rear or trailing surface on the knife blade 78 is not great and it may vary within effective limits. It is contemplated that if the effective extent of this leading edge in a leading direction is less than one-eighth of the overall width of the knife blade, proper shearing action without return of the product toward the feed screw 16 will be obtained.

Each knife blade 78 is formed with an opening or hole 92 therein in the medial regions 80 thereof, the hole being designed for reception therein of the pin 71 which is provided on one of the backing arms 50 when the knife and spider are assembled. The transverse extent of the opening 92 is slightly greater than the diameter of the pin 71 to provide a slight clearance between the pin and the edge of the hole during initial assembly operations as will become clear subsequently.

Figure 6:
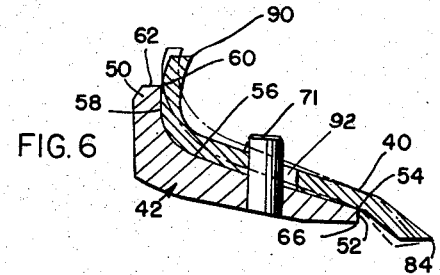
Fig. 6 is an enlarged sectional view, schematic in its representation, illustrating the manner in which the two cutter assembly parts are manually assembled upon and detached from each other.

In order to assemble the cutter, i.e., to connect the knife 40 and backing spider 42 in operative relationship, the two parts are superimposed upon each other as shown in dotted lines in Fig. 6 with the four knife blades 78 overlying the four radial arms 50 of the spider 42. In this position of the parts, the hole 48 in the knife blade will be in axial alignment with the square opening 46 in the spider 42. The curvature and extent of the upper faces of the various spider arms 50 and the curvature and extent of the underneath surfaces of the corresponding knife blades 78 are such that the knife 40 will not readily fall into its "home" position with the radial parts of the knife and spider in face-to-face contact as previously described. The parts are so designed that the distance between the pin 71 and the edge 60 is slightly less than the distance between the hole 92 and the extreme trailing surface of the knife blade 78 and, thus, upon initial positioning of the knife on the spider as set forth above, the forward edge 60 of each flat upper surface 62 of the spider 42 will bear against the underneath surface of its respective knife blade 50 and maintain the blade in a slightly elevated position with respect to the spider arm 50 as shown in dotted lines in Fig. 6. The knife 40 will thus loosely rest upon its supporting spider 42. Thereafter, by the application of downward pressure on the knife 40 as a whole, the body of each knife blade may be caused to snap past the edge 60 so that the knife will fall into its "home" position on the spider as shown in full lines in Fig. 6 with each knife blade 40 nested within the recess 56, 58 provided for it on its respective spider arm. Removal of the knife blade from the spider for purposes of inspection, replacement or repair such as sharpening of the knife edges 84 and 90, may be accomplished by a reversal of the process wherein the knife is pulled vertically away from its supporting spider.

In the operation of the cutter assembly 10 within the assembled meat grinder 12, the various parts assume the positions shown in Figs. 1 and 4, with the shearing edges 90 of the four knife blades 50 in shearing contact with the inside face of the perforated shear plate 26. As the cutter assembly rotates in unison with the central shaft 30 and feed screw 16, the leading cutting edge 84 of each knife blade sweeps circumferentially around the bore 22 within the mass of the product which has been delivered to this region of the bore 22 by the feed screw 16 and severs a quantity of the product whereby the severed mass travels inwardly along the inclined surfaces 82 and 80 and is forced forwardly against the shear plate 26 thus compacting the product in the extreme forward region of the bore 22. Some of this product which now exists under relatively high pressure is forced through the openings 27 in the shear plate and, at such times, as the shearing edge 90 arrives in the vicinity of the openings 27, the product is severed by a shearing action between the edges of the openings 27 and the shearing edge 90. Because of the relatively large circumferential extent by which the cutting edge 84 leads the shearing edge 90 and because of the relatively wide inclined impelling surface 82, 80 which exerts a camming action of the product tending to force the same forwardly, any tendency for the shearing edge 90 to exert a scooping action on the product tending to return the same rearwardly toward the feed screw 16 is completely nullified by the camming or wiping action of the leading region of the blade which precedes the shearing edge 90 in its circumferential path of travel.

The invention is not to be limited to the exact arrangement of parts as shown in the accompanying drawing or described in this specification as various changes in the details of construction may be resorted to without departing from the spirit of the invention. Only insofar as the invention has particularly been pointed out in the accompanying claims is the same to be limited.

Having thus described the invention what I claim as new and desire to secure by Letters Patent is:

1. The combination with a meat grinder having a casing provided with an axial bore across the outlet end of which there extends a perforated shear plate, and a feed screw rotatable in said bore for impelling the product forwardly toward the shear plate, of a cutter positioned between said feed screw and plate and rotatable in unison with the feed screw, said cutter comprising a knife in the form of a sheet metal stamping and having a plurality of substantially radially extending knife blades, each blade affording a leading cutting edge spaced rearwardly from said shear plate, a trailing reentrant portion providing a leading shearing edge in contact with and adapted to sweep around said shear plate, and a medial body portion extending between the cutting edge and reentrant portion, said medial body portion presenting a smooth forwardly facing surface extending at an angle to the shear plate and having the same pitch direction as the pitch direction of the feed screw whereby portions of the product severed by said cutting edge are forced forwardly in said bore into the path of movement of said shearing edge, and a backing spider for said knife, said spider having a central driving hub and a plurality of backing arms, one for each knife blade, each backing arm being formed with a forwardly facing shallow recess conforming in contour to the contour of the medial body portion of its respective knife blade and into which recess said medial body portion fits snugly, the trailing region of each backing arm being formed with a hook portion embracing the reentrant portion of its respective knife blade, there being a hole in the medial portion of each knife blade, and a locking pin extending forwardly into said hole from the surface of the recess provided in the adjacent backing arm.

2. The combination with a meat grinder having a casing provided with an axial bore across the outlet end of which there extends a perforated shear plate, and a feed screw rotatable in said bore for impelling the product forwardly toward the shear plate, of a cutter positioned between said feed screw and plate and rotatable in unison with the feed screw, said cutter comprising a knife in the form of a sheet metal stamping and having a plurality of substantially radially extending knife blades, each blade affording a leading cutting edge spaced rearwardly from said shear plate, a trailing reentrant portion providing a leading shearing edge in contact with and adapted to sweep around said shear plate, and a medial body portion extending between the cutting edge and reentrant portion, said medial body portion presenting a smooth forwardly facing surface extending at an angle to the shear plate and having the same pitch direction as the pitch direction of the feed screw whereby portions of the product severed by said cutting edge are forced forwardly in said bore into the path of movement of said shearing edge, and a backing spider for said knife, said spider having a central driving hub and a plurality of backing arms, one for each knife blade, each backing arm being formed with a forwardly facing shallow recess conforming in contour to the contour of the medial body portion of its respective knife blade and into which recess said medial body portion fits snugly, the trailing region of each backing arm being formed with a hook portion having a leading edge and embracing the reentrant portion of its respective knife blade, there being a hole in the medial portion of each knife blade, and a locking pin of lesser transverse extent than the transverse extent of said hole and extending forwardly into the hole from the surface of the recess provided in the adjacent backing arm, the distance between the leading edge of said hook portion and pin being slightly less than the distance between the hole and trailing side of the reentrant portion whereby said knife blade is adapted to be forced into said recess by a snap action.

3. A two-piece rotary cutter assembly for meat grinders comprising in combination a spider having a central mounting hub, a plurality of backing arms extending substantially radially from the hub, each of said arms being formed with a forwardly facing concave curved surface presenting a leading edge and a trailing edge, said surface increasing in the sharpness of its curvature from the leading edge to the trailing edge thereof so as to provide a reentrant driving hook in the trailing edge region of the arm, and a knife removably mounted on said spider, said knife having a central hub and a plurality of knife blades, one for each backing arm, said blades having leading edges and trailing edges and having body portions of uniform thickness and the rear faces of which are contoured to fit within said concave surface of the respective backing arm in face-to-face relationship, the leading edges of said blades being sharpened to provide a cutting edge and the trailing edge regions of the blades being curved to provide a reentrant portion fitting within the driving hook of its respective backing arm, there being a hole formed in the body portion of each knife blade, and a protuberance provided on each backing arm extending forwardly from the curved surface thereof and projecting into the hole in the adjacent knife blade, the distance between the leading edge of said hook and said protuberance being slightly less than the distance between said hole and the trailing side of the reentrant portion of the knife blade whereby said blade is adapted to be forced into position on its respective backing arm by a snap action.

4. The combination with a meat grinder having a casing provided with an axial bore across the outlet end of which there extends a perforated shear plate, and a feed screw rotatable in said bore for impelling the product forwardly toward the shear plate, of a cutter positioned between said feed screw and plate and rotatable in unison with the feed screw, said cutter comprising a knife in the form of a sheet metal stamping and having a plurality of substantially radially extending knife blades, each blade affording a leading cutting edge spaced rearwardly from said shear plate, a curved relatively short trailing reentrant portion of small radius of curvature and providing a leading shearing edge in connection with and adapted to sweep around said shear plate, and a smooth medial body portion extending between the cutting edge and reentrant portion and merging gradually with the latter, said medial body portion presenting a smooth forwardly facing surface extending at an angle to the shear plate and having the same pitch direction as the pitch direction of the feed screw whereby portions of the product severed by said cutting edge are forced forwardly in said bore into the path of movement of said shearing edge, and a backing spider for said knife, said spider having a central driving hub and a plurality of backing arms, one for each knife blade, each backing arm being formed with a forwardly facing shallow recess conforming in contour to the contour of said medial body portion of its respective knife blade and into which recess said medial body portion fits snugly, the trailing region of each backing arm being formed with a hook portion embracing the reentrant portion of its respective knife blade.

References Cited in the file of this patent

UNITED STATES PATENTS

| | | |
|---|---|---|
| 419,104 | Baltzley | Jan. 7, 1890 |
| 930,799 | Sander | Aug. 10, 1909 |
| 2,259,623 | Dieckmann | Oct. 21, 1941 |
| 2,431,267 | May | Nov. 18, 1947 |